A. B. OTIS.
BOAT.
APPLICATION FILED JAN. 28, 1908.
904,357.
Patented Nov. 17, 1908.
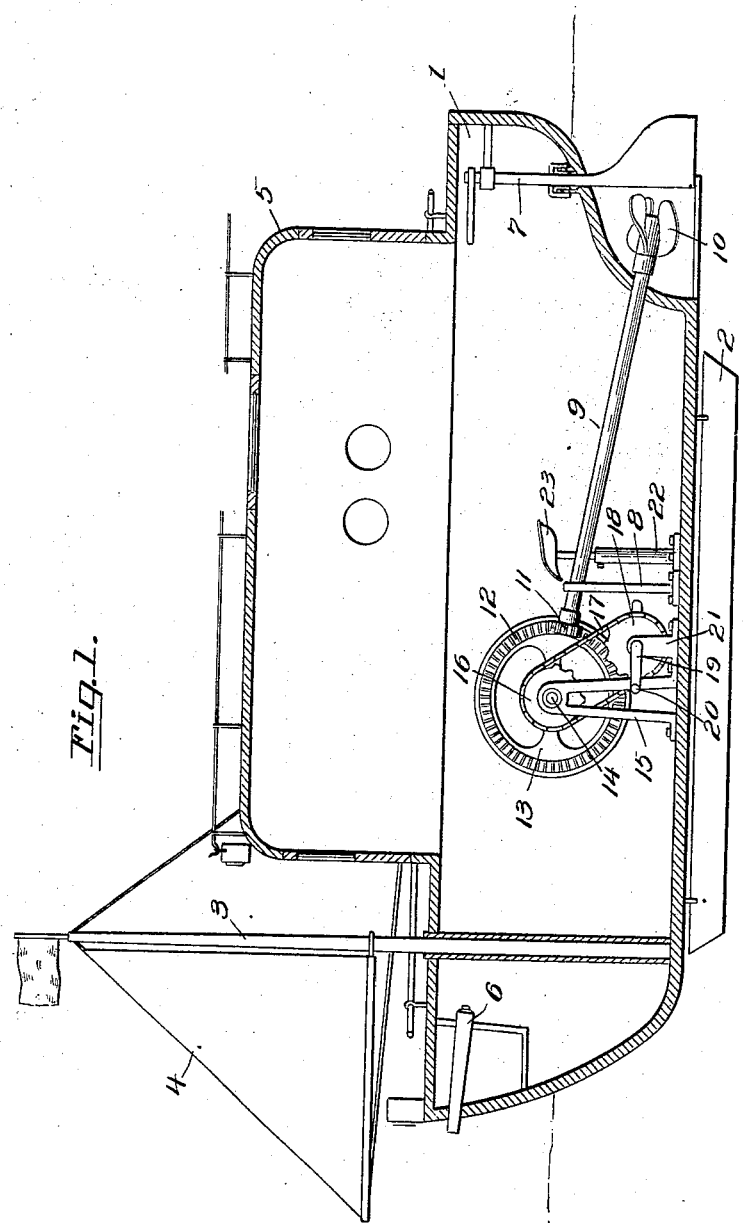
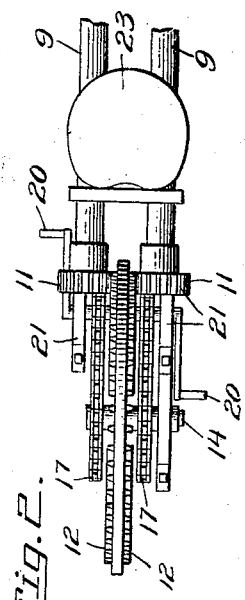
Witnesses
F. C. Gibson.
Inventor
Alexs B. Otis.
By Victor J. Evans
Attorney

UNITED STATES PATENT OFFICE.

ALEXS B. OTIS, OF VANCOUVER, WASHINGTON.

BOAT.

No. 904,357.      Specification of Letters Patent.      Patented Nov. 17, 1908.

Application filed January 28, 1908. Serial No. 413,040.

*To all whom it may concern:*

Be it known that I, ALEXS B. OTIS, a citizen of the United States of America, residing at Vancouver, in the county of Clarke and State of Washington, have invented new and useful Improvements in Boats, of which the following is a specification.

This invention relates to boats, and one of the principal objects of the same is to provide simple and efficient means for manually propelling boats.

Another object of the invention is to provide a pair of screw propeller shafts and means for operating them, said means comprising foot pedals and suitable connecting mechanism between the pedals and the shafts.

These and other objects may be attained by means of the construction illustrated in the accompanying drawing, in which,—

Figure 1 is a longitudinal section taken through a boat made in accordance with my invention and showing the means for propelling the boat in elevation. Fig. 2 is a plan view of the mechanism for operating the propeller shafts.

Referring to the drawing for a more specific description of my invention, the numeral 1 designates a boat provided with a keel 2 and having a mast 3 near the bow end of the boat and a jib 4 connected to said mast. The boat may be provided with a closed cabin 5, a gun 6 at the bow and a rudder 7 at the stern.

Journaled in an upright 8 is a pair of parallel shafts 9 which are inclined toward the stern of the boat and extend through the same and are provided with suitable propeller wheels 10. The front ends of the shafts 9 are provided with gear wheels 11, said gear wheels meshing with gear teeth 12 formed upon the opposite sides near the periphery of a large wheel 13, the stub axle 14 of which is journaled in standards 15 secured to the floor or lower deck of the boat. Mounted on the shaft 14 upon opposite sides of the wheel 13 are sprocket wheels 16, and a sprocket chain 17, one upon each side of the wheel, passes around the sprocket wheel 16 and around a similar sprocket wheel 18 secured to a crank shaft 19 and provided with suitable foot pedals 20. The shaft 19 is journaled in brackets 21 located upon opposite sides of the large wheel 13. A seat standard 22 is secured to the lower deck of the boat, and a seat 23 is adjustably secured in the standard 22 in an obvious manner.

The operation of my invention may be obvious from the foregoing. The operator sitting upon the seat 23 works the pedals 20, and thus rotates the parallel shafts 9 and the propeller wheels 10.

Having thus described the invention, what is claimed as new, is:—

A boat having a horizontally disposed driven shaft supported in spaced relation to the bottom of said boat, a wheel fixed to the shaft and having at each side an annular series of gear teeth, sprocket wheels secured to the shaft adjacent to the wheel, a crank or drive shaft located adjacent to the wheel, sprocket wheels carried by the just-named shaft, chains engaging the sprocket wheels for operating the driven shaft, a pair of shafts disposed at right angles to the driven shaft, gears secured to the pair of shafts and meshing with the annular gear teeth, and propellers secured to the pair of shafts and disposed outwardly of the stern of said boat.

In testimony whereof I affix my signature in presence of two witnesses.

ALEXS B. OTIS.

Witnesses:
    M. M. CONNOR,
    F. W. TEMPES.